United States Patent
Sangra et al.

(10) Patent No.: US 10,972,353 B1
(45) Date of Patent: Apr. 6, 2021

(54) IDENTIFYING CHANGE WINDOWS FOR PERFORMING MAINTENANCE ON A SERVICE

(71) Applicant: BMC Software, Inc., Houston, TX (US)

(72) Inventors: Sudhir Sangra, Pune (IN); Eric Michael Anderson, Friendswood, TX (US); Pravin Mahadeo Gole, Pune (IN); Anil Chandrakant Sogam, Pune (IN)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 16/836,425

(22) Filed: Mar. 31, 2020

(51) Int. Cl.
*H04L 12/24* (2006.01)
*G06F 16/2458* (2019.01)
*H04L 12/26* (2006.01)

(52) U.S. Cl.
CPC ...... *H04L 41/0893* (2013.01); *G06F 16/2474* (2019.01); *H04L 41/22* (2013.01); *H04L 43/045* (2013.01); *H04L 43/065* (2013.01); *H04L 43/067* (2013.01)

(58) Field of Classification Search
CPC ............. H04L 41/082; H04L 41/0823; H04L 41/0893; H04L 43/065; H04L 43/067; G06F 16/2474
See application file for complete search history.

(56) References Cited

U.S. PATENT DOCUMENTS

| | | | | |
|---|---|---|---|---|
| 5,216,612 A * | 6/1993 | Cornett | ................ | G06Q 10/06 700/96 |
| 7,203,745 B2 * | 4/2007 | Sheehy | ................ | G06F 8/61 706/45 |
| 2004/0254984 A1 * | 12/2004 | Dinker | ................ | H04L 69/40 709/205 |
| 2015/0066813 A1 * | 3/2015 | Andreatta | ............... | G06F 9/505 706/11 |
| 2015/0124644 A1 * | 5/2015 | Pani | .................... | H04L 61/2007 370/254 |

(Continued)

OTHER PUBLICATIONS

Fengtian Chang, Guanghui Zhou, Chao Zhang, Zhongdong Xiao, Chuang Wang. "A service-oriented dynamic multi-level maintenance grouping strategy based on prediction information of multi-component systems" Journal of Manufacturing Systems, vol. 53. 2019. pp. 49-61. (Year: 2019).*

(Continued)

*Primary Examiner* — John M MacIlwinen
(74) *Attorney, Agent, or Firm* — Brake Hughes Bellermann LLP

(57) ABSTRACT

Systems and techniques for identifying a common change window for one or more services implemented on one or more hosts include querying time series performance data for each host of a service to identify time slots of low resource consumption on the host, annotating the time slots with service tags, where the service tags identify host information and service information, creating groups of time slots using the service tags, using dynamic clustering to create clusters of hosts using the groups of time slots, and generating at least one common change window by eliminating duplicate hosts from the clusters of the hosts.

21 Claims, 13 Drawing Sheets

(56) References Cited

U.S. PATENT DOCUMENTS

2017/0083822 A1\* 3/2017 Adendorff ............... G07C 5/006
2018/0167277 A1\* 6/2018 Mahimkar ............ H04L 41/145

OTHER PUBLICATIONS

J. Aßfalg et al.: "TQuEST: Threshold Query Execution for Large Sets of Time Series", In: Ioannidis Y. et al. (eds) Advances in Database Technology—EDBT 2006, Lecture Notes in Computer Science, vol. 3896, pp. 1147-1150, 2006.

\* cited by examiner

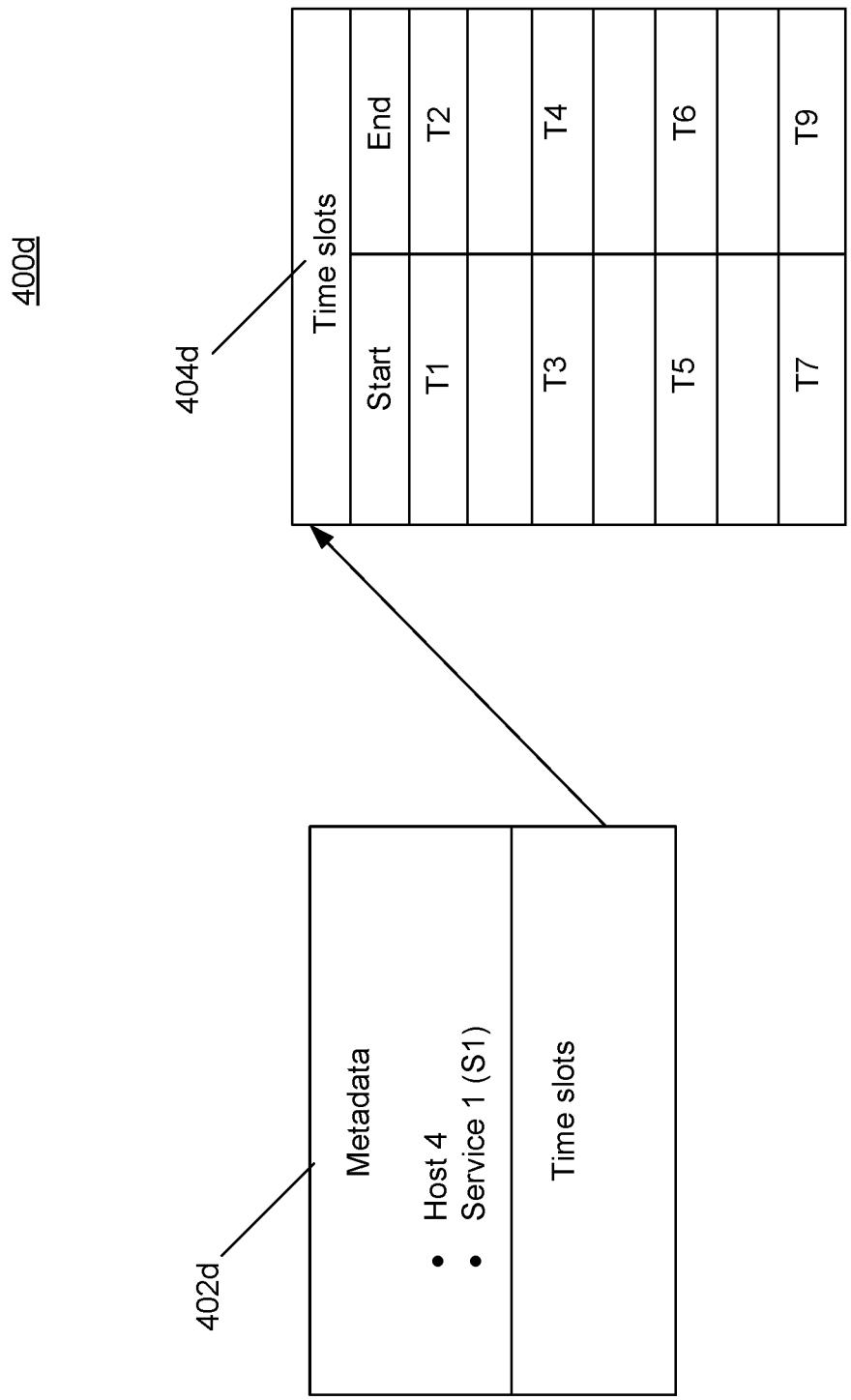

IDENTIFYING CHANGE WINDOWS FOR PERFORMING MAINTENANCE ON A SERVICE

TECHNICAL FIELD

This description relates to identifying change windows across multiple computer systems to perform maintenance on a service.

BACKGROUND

A service is a set of interconnected applications, components, and hosts, which are configured to offer a service, for example, to an organization such as a corporation. A service can be internal, like an organization email system, or a service can be customer-facing, like an organization website. In some instances, a service can be both internal and external.

During the lifecycle of a service, the service may need updating. For example, the applications, components, and/or the hosts that constitute the service may require updates and/or other maintenance to maintain the quality and performance of the service. The updates may include patches, changes, and other types of updates. To update and/or perform maintenance on the service, a change window is identified. A change window is a period of time during which the updates and/or maintenance is performed on the service. The change window is the period of time during which the service is taken offline and the service is unavailable and/or the service's functionality is significantly reduced.

In conventional systems, a change window may be chosen without any knowledge of the service's historical behavior, including the historical behavior of the application, components, and hosts that constitute the service. For example, in a conventional system, a change window from 5:00 PM on Saturday for 5 hours or 4:00 AM on Sunday for 10 hours may be randomly selected and based only on the simple assumption that on weekends the service is not accessed and bringing the service down during one of these randomly selected times during the weekend will have less impact on customers. However, a more suitable change window may exist at 4 PM Wednesday for 3 hours because of low activity on the service. Upgrading the service during the 4 PM on Wednesday time window will minimize impact on customers of the service, including internal and/or external customers.

Identifying a change window for a service that has a minimum impact on customers is tremendously difficult, especially when the multiple services use one or more of the same resources such as the same applications, components, and/or hosts. Said another way, an application, component, and/or host may be a common or shared resource among multiple services. Thus, an update and/or maintenance performed on one service may not only affect the customers of that service, but also may affect the customers of other services that share the common resource. Additionally, an administrator may have limited visibility into a service and its applications, components, and hosts and may have access to only a portion of the application, components, and hosts. The administrator may not have access to other services that use the same applications, components, and hosts.

This problem is compounded when a single component (like a database server) is used to support multiple services. Understanding the utilization of each component in a microservice based architecture, where components are frequently shared is almost impossible. A technical problem exists when applications, components, and/or hosts support multiple services. For example, an enterprise Kubernetes cluster may be a component that supports multiple (e.g., twenty five or more) different services. Determining when to take the Kubernetes cluster offline to perform an update to a supported service at a time when it has the least impact across all the different services is a task that cannot be accomplished in the human mind or with a pen and paper. It is desirable to find a technical solution to programmatically determine the optimum change window to perform updates and/or maintenance on the service when the change window has the least impact across all services.

SUMMARY

According to one general aspect, a computer-implemented method for identifying a common change window for one or more services implemented on one or more hosts include querying time series performance data for each host of a service to identify time slots of low resource consumption on the host, annotating the time slots with service tags, where the service tags identify host information and service information, creating groups of time slots using the service tags, using dynamic clustering to create clusters of hosts using the groups of time slots, and generating at least one common change window by eliminating duplicate hosts from the clusters.

Implementations may include one or more of the following features. For example, the method may further include enabling selection of the at least one common change window via a graphical user interface on a display. The method may further include monitoring each of the hosts and collecting the time series performance data from each of the hosts over a network, where the time series performance data includes the resource consumption on the host.

In some implementations, creating the groups of time slots may include creating the groups of time slots for each service utilizing at least one of the hosts.

In some implementations, using dynamic clustering to create the clusters of hosts may include selecting an initial host and creating initial clusters of time slots for the initial host, adding other hosts to the initial clusters of time slots when a distance between time slots for the other hosts and the initial clusters of time slots are within a threshold distance, and creating and adding new time slots to the initial clusters of time slots when the distance between the time slots for the other hosts and the initial clusters of time slots exceed the threshold distance.

In some implementations, generating the at least one common change window may include calculating a weight of each cluster using a count of hosts in each cluster and, for the duplicate hosts in multiple clusters, removing the duplicate hosts from the clusters having the lowest weight.

In some implementations, generating the at least one common change window may include assigning a host weight to each host based on a criticality of the host within the service, calculating a weight for each cluster using a sum of the host weights, and, for the duplicate hosts in multiple clusters, removing the duplicate hosts from the clusters having the lowest weight.

In another general aspect, a computer program product for identifying a common change window for one or more services implemented on one or more hosts is tangibly embodied on a non-transitory computer-readable medium and includes executable code that, when executed by at least one computing device, is configured to cause the at least one computing device to query time series performance data for each host of a service to identify time slots of low resource consumption on the host, annotate the time slots with service tags, where the service tags identify host information and service information, create groups of time slots using the service tags, use dynamic clustering to create clusters of hosts using the groups of time slots, and generate at least one common change window by eliminating duplicate hosts from the clusters.

Implementations may include one or more of the following features. For example, the computer program product may further include executable code that, when executed by the at least one computing device, is configured to cause the at least one computing device to enable selection of the at least one common change window via a graphical user interface on a display. The computer program product may further include executable code that, when executed by the at least one computing device, is configured to cause the at least one computing device to monitor each of the hosts and collect the time series performance data from each of the hosts over a network, where the time series performance data includes the resource consumption on the host.

In some implementations, the executable code that, when executed by the at least one computing device, is configured to cause the at least one computing device to create the groups of time slots includes executable code that, when executed by the at least one computing device, is configured to cause the at least one computing device to create the groups of time slots for each service utilizing at least one of the hosts.

In some implementations, the executable code that, when executed by the at least one computing device, is configured to cause the at least one computing device to use dynamic clustering to create the clusters of hosts includes executable code that, when executed by the at least one computing device, is configured to cause the at least one computing device to select an initial host and creating initial clusters of time slots for the initial host, add other hosts to the initial clusters of time slots when a distance between time slots for the other hosts and the initial clusters of time slots are within a threshold distance, and create and add new time slots to the initial clusters of time slots when the distance between the time slots for the other hosts and the initial clusters of time slots exceed the threshold distance.

In some implementations, the executable code that, when executed by the at least one computing device, is configured to cause the at least one computing device to generate the at least one common change window includes executable code that, when executed by the at least one computing device, is configured to cause the at least one computing device to calculate a weight of each cluster using a count of hosts in each cluster and, for the duplicate hosts in multiple clusters, remove the duplicate hosts from the clusters having the lowest weight.

In some implementations, the executable code that, when executed by the at least one computing device, is configured to cause the at least one computing device to generate the at least one common change window includes executable code that, when executed by the at least one computing device, is configured to cause the at least one computing device to assign a host weight to each host based on a criticality of the host within the service, calculate a weight for each cluster using a sum of the host weights, and, for the duplicate hosts in multiple clusters, remove the duplicate hosts from the clusters having the lowest weight.

In another general aspect, a system for identifying a common change window for one or more services implemented on one or more hosts includes at least one memory including instructions and at least one processor that is operably coupled to the at least one memory and that is arranged and configured to execute instructions that, when executed, cause the at least one processor to implement an application. The application includes an analysis module that is configured to query time series performance data for each host of a service to identify time slots of low resource consumption on the host and annotate the time slots with service tags, where the service tags identify host information and service information. The application includes a grouping module that is configured to create groups of time slots using the service tags. The application includes a cluster module that is configured to use dynamic clustering to create clusters of hosts using the groups of time slots and generate at least one common change window by eliminating duplicate hosts from the clusters.

Implementations may include one or more of the following features. For example, the application may further include a graphical user interface on a display that is configured to enable selection of the at least one common change window. The application may further include a monitoring module that is configured to monitor each of the hosts and collect the time series performance data from each of the hosts over a network, where the time series performance data includes the resource consumption on the host.

In some implementations, the grouping module is configured to create the groups of time slots for each service utilizing at least one of the hosts.

In some implementations, the cluster module is configured to select an initial host and creating initial clusters of time slots for the initial host, add other hosts to the initial clusters of time slots when a distance between time slots for the other hosts and the initial clusters of time slots are within a threshold distance, and create and add new time slots to the initial clusters of time slots when the distance between the time slots for the other hosts and the initial clusters of time slots exceed the threshold distance.

In some implementations, the cluster module is configured to calculate a weight of each cluster using a count of hosts in each cluster and, for the duplicate hosts in multiple clusters, remove the duplicate hosts from the clusters having the lowest weight.

In some implementations, the cluster module is configured to assign a host weight to each host based on a criticality of the host within the service, calculate a weight for each cluster using a sum of the host weights, and, for the duplicate hosts in multiple clusters, remove the duplicate hosts from the clusters having the lowest weight.

The details of one or more implementations are set forth in the accompanying drawings and the description below. Other features will be apparent from the description and drawings, and from the claims.

BRIEF DESCRIPTION OF THE DRAWINGS

FIG. 4D is an example output of the analysis module for Host 4 of FIG. 1.

DETAILED DESCRIPTION

Figure 1:
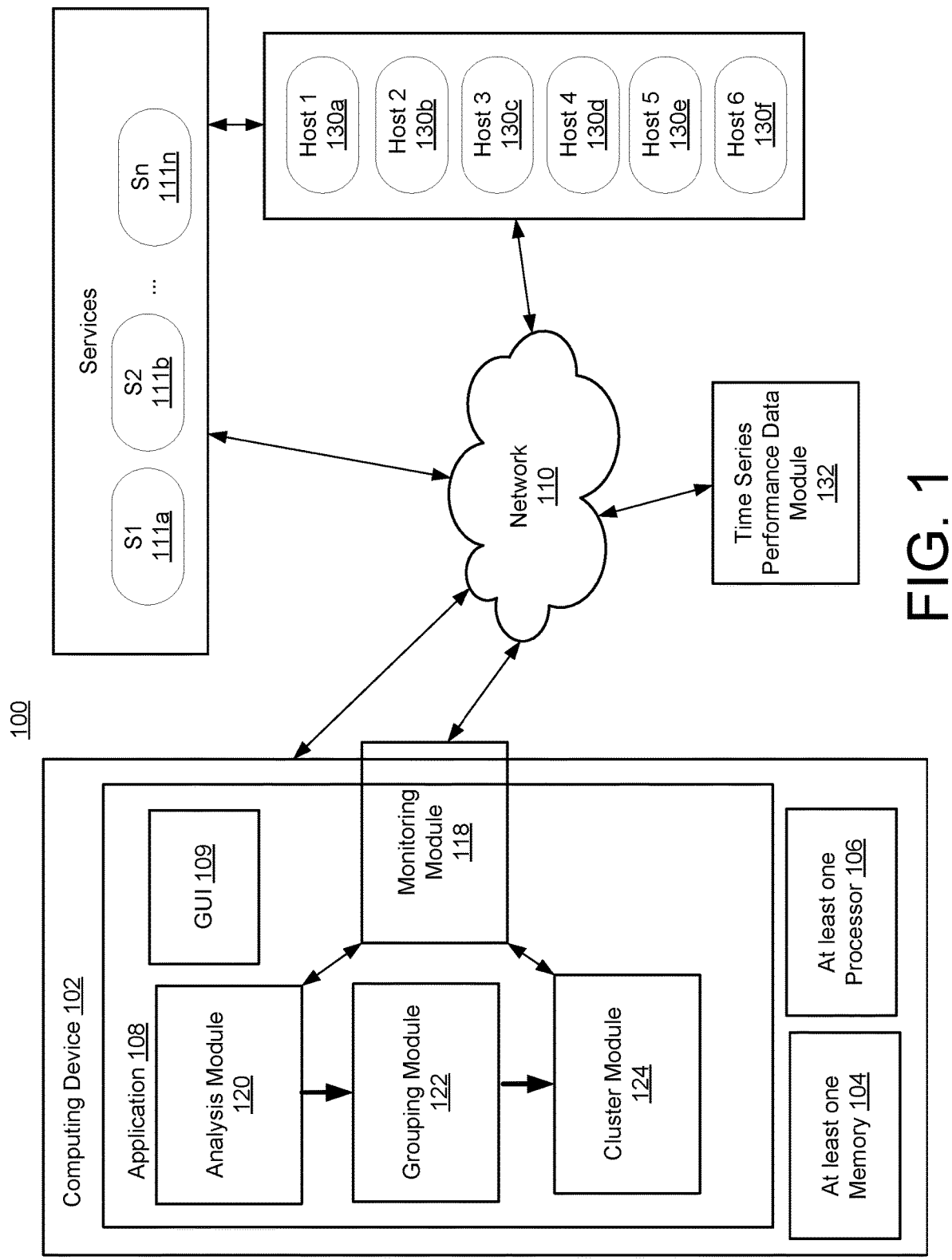
FIG. 1 is a block diagram of a system for identifying a common change window for one or more services implemented on one or more hosts.

This document describes a technical solution to the above identified technical problems. The technical solution includes a system and techniques for programmatically determining a change window for when to perform maintenance and/or updates to a service during a time of the least amount of impact across services that share resources (e.g., applications, components, and hosts). The system and techniques identify potential change windows based on service modeling and component utilization rates across multiple services and recommend a single change window or multiple change windows based on behavioral analytics for upgrading and/or maintaining the applications, components, and/or hosts of the services. The system and techniques provide advantages over conventional solutions by programmatically identifying the change window or change windows by looking at relationships between multiple services that use shared resources. The system and techniques are an improvement over conventional solutions that pre-schedule change windows based on a single service, where the process is entirely manual and results in outages taken during heavy workloads, or in many cases affecting services that were not originally identified as being affected in the change record.

More specifically, the system and techniques identify a change window or change windows based on the correlation of identified time slots using historical performance data of applications, components, and/or hosts of a service and multiple services. Hosts includes the physical and/or virtual systems on which the application and other components of a service or services may run. The hosts include resources such as central processing units (CPUs), memory, and other measurable resources such as network bandwidth usage, disk usage (e.g., disk space used and disk accesses used). Historical time series data is collected for each host. The times series data is a historical record of the performance metrics for the various resources on the host. The historical time series data is queried for metrics to identify one or more time slots where the host resources consumed by the workloads of the services using the host is minimum. These time slots are tagged with metadata (also referred to interchangeably as service tags). The metadata or service tags may include information such as, for example, host configuration, service or services supported by the host, and applications running on the hosts. The results of the query return a single time slot or multiple time slots for each host.

The time slots and the metadata or the service tags are used to create service-aware groups of time slots. Within the group, time slot clusters are created by setting all the identified time slots of a selected host as centroid and then adding the other hosts to the cluster if the identified time slot of the host overlaps with the cluster centroid. The host can belong to different clusters because there can be multiple time slots identified when the resource consumption is minimum. Further, the membership of hosts in multiple clusters is handled in a manner such that each host is a member of one cluster. In some implementations, the weight of the clusters is used for removing the host from multiple clusters. The result is a time slot recommendation or set of time slot recommendations for the host member of the service for when the service may be taken offline and have the least impact because the time slots are when the resources are least utilized. Upgrading applications and components on hosts within the cluster for a specific service during the recommended time slot will minimize the impact on the services.

FIG. 1 is a block diagram of a system 100 for identifying a common change window for one or more services implemented on one or more hosts. The system 100 programmatically identifies potential change windows based on service modeling and host utilization rates across multiple systems to recommend at least one change window based on analytics for upgrading and/or maintaining the hosts, applications, and/or components of services. The system 100 advantageously minimizes the offline time of services during higher utilization periods, thereby increasing the quality of service by performing upgrades and maintenance during lower utilization periods. The system 100 also may account for service criticality when identifying and recommending potential change windows.

The system 100 includes a computing device 102, a network 110, services 111a-111n, hosts 130a-130f, and time series performance data module 132. As used herein, a service 111a-111n is a set of interconnected applications, components, and hosts, which are configured to offer a service, for example, to an organization such as a corporation. A service 111a-111n can be internal, like an organization email system, or a service can be customer-facing, like an organization website. In some instances, a service 111a-111n can be both internal and external. In some implementations, a service may be referred to as a business service. The services 111a-111n each represent a different service, with the ellipses ( . . . ) and service Sn 111n representing an unlimited number of services.

As used herein, a change window refers to a period of time or periods of time during which changes are made to a service or services, including the applications, components, and/or hosts that constitute the service or services.

The hosts 130a-130f are computing platforms on which the services 111a-111n run. The hosts 130a-130f host the services 111a-111n. The hosts 130a-130f may be physical and/or virtual machines that include applications and components, all of which may be elements of the services 111a-111n. Multiple services 111a-111n may utilize multiple different hosts 130a-130f and more than one of the services 111a-111n may use the same host. While six hosts 130a-130f are illustrated in FIG. 1, it is understood that this is merely an example and that there may be fewer or many more hosts.

The system 100 includes a computing device 102 having at least one memory 104, at least one processor 106 and at least one application 108. The computing device 102 may communicate with one or more other computing devices over a network 110. For instance, the computing device 102 may communicate with hosts 130a-130f over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one processor 106 may include a graphics processing unit (GPU) and/or a central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as metadata and change windows generated by the application 108 and its components used by the application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network, where a user accesses the application 108 from another computing device over a network, such as the network 110. In one implementation, the application 108 may be an application configured to identify a common change window for one or more services implemented on one or more hosts. The application 108 may be an application such as an integrated platform for service availability and performance management for an information technology (IT) environment. The application may include features and functionality related to event management, impact management, performance monitoring, and application modeling in a single, seamless solution for physical, virtual, and cloud environments. The application also may include features and functionality related to threat remediation, patching, compliance, configuration, provisioning, and reporting in physical, virtual, and cloud environments. The application 108 may be a standalone application that runs on the computing device 102. Alternatively, the application 108 may be an application that runs in another application such as a browser application.

Further to the features and functionality related to identifying a common change window or common change windows, the application 108 is configured to perform this functionality across multiple services 111a-111n, which may be implemented using multiple hosts 130a-130f. The application 108 buckets or clusters the hosts together in one or more time slots in a service-aware manner based on the times of least resource usage and selects one or more change windows as the optimal times to perform maintenance or updates. The application 108 provides an advantage over previous conventional solutions by identifying the optimum time to take a shared resource offline with the least impact to the services 111a-111n sharing the resource. A shared resource, as used herein, includes a host 130a-130f and the components and applications running on the host 130a-130f that are shared by multiple services 111a-111n.

The application 108 includes a graphical user interface (GUI) 109. The GUI 109 provides an interface for user interaction with the application 108. The GUI 109 enables user selection and input and also enables an interface for display of results and output from the application 108. Thus GUI 109 provides for interaction with the user including enabling selection of at least one common change window from the displayed results and output from the application 108.

The application 108 includes a monitoring module 118, an analysis module 120, a grouping module 122, and a cluster module 124. The monitoring module 118 is configured to monitor each of the hosts 130a-130f and collect time series performance data from each of the hosts 130a-130f over the network 110. The monitoring module 118 may store the collected time series performance data in a time series performance data module 132. The time series performance data module 132 may be a database implemented on a computing device. In some implementations, as illustrated in FIG. 1, the time series performance data module 132 may be a stand alone module that is accessed by the monitoring module 118 and the application 108 through the network 110. In some implementations, the time series performance data module 132 may be implemented on the computing device 102 and may be a part of the application 108. The time series performance data is historical performance data of the hosts 130a-130f and the applications and components on the hosts. The time series performance data is captured for each host individually. The time series performance data includes metrics for resource consumption and utilization of the hosts and components including central processing units (CPUs), memory, network input/output rates, and other performance and utilization metrics. The time series performance data may be captured over a period of time sufficient to provide reliable performance and utilization metrics on each host. The monitoring module 118 may use monitoring tools to collect the performance data in real time or in near real time and store the collected data in the time series performance data module 132.

The analysis module 120 is configured to query the time series performance data stored in the time series performance data module 132 for each host 130a-130f of a service 111a-111n to identify time slots of low resource consumption on each host 130a-130f. In some implementations, the analysis module 120 may use a time series query language, which provides the constructs used to perform the queries of the time series data. The queries may include threshold queries that enable searches for time series whose values are within defined thresholds at certain time intervals. For instance, one query of the time series performance data may include splitting the time series data into time slots, where the time slot is a configurable slot length. An average of resource consumption values may be computed and compared with a threshold value for resource consumption during a time slot. If the value meets the threshold criteria, then the time slot is selected as part of the query.

For example, in some implementations, the time series performance data may include monthly performance data from a particular host. The analysis module 120 may divide the monthly performance data into multiple time slots. For instance, the analysis module 120 may divide the monthly performance data into 30 time slots, with each time slot representing one day of the month (or one twenty four hour period for the month). In such a case, the duration of each time slot may be twenty four hours. The analysis module 120 may calculate daily average processor resource consumption for each daily time slot and set a threshold value of 30. For time slots where the daily average resource consumption is less than 30, then that time slot is identified and selected as a time slot of low resource consumption for that host.

In some implementations, a query identifies multiple time slots of low resource consumption for each host 111a-111n. That is, the result of the query performed by the analysis module 120 is a listing of one or more time slots of low resource consumption for each host. As used herein, a time slot is a period of time or interval defined by a start time (e.g., T(x)) and an end time (e.g., T(y)). The start time and the end time may be marked by a day of the week and/or a time on a twenty four hour clock cycle or a twelve hour clock cycle. The length of the time slot may be designated in one of several time units including, for example, hours, minutes, seconds and combinations thereof.

Following the query of the time series performance data and the identification of the time slots of low resource consumption on each host, the analysis module 120 annotates the time slots with service tags, where the service tags identify host information and service information. For instance, the analysis module 120 annotates the time slots with service tags that identify the host, the services supported by the host, applications running on the hosts, and/or other information. The service tag may include additional information including configuration data for the host such as, for instance, total CPU, memory, network space, disk size, and other information related to the host configuration data.

Figure 3:
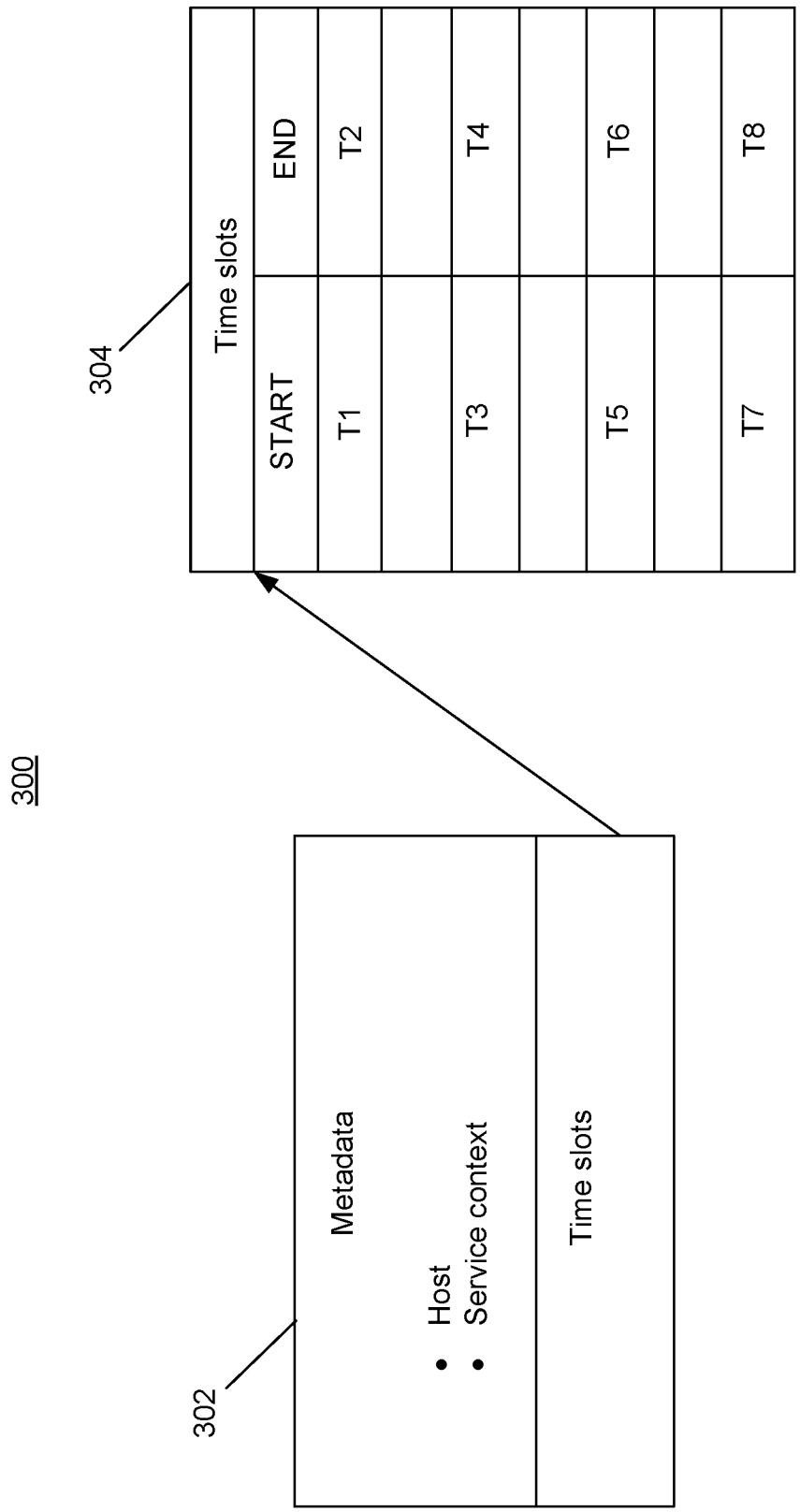
FIG. 3 is an example output of the analysis module of FIG. 1.

Referring to FIG. 3, an example generic output 300 of the analysis module 120 is illustrated. In some implementations, the output 300 of the analysis module 120 is for each host. For each host, the output includes metadata (or service tag) 302, which lists the particular host, the service or services supported by the host and the time slots 304 of the lowest resource consumption for the host based on the query of the time series performance data. The time slots 304 may correspond to a pre-defined period of time that was defined as part of the query parameters. For each of the four identified time slots (T1-T2, T3-T4, T5-T6, and T7-T8) there is a start time (T1, T3, T5, and T7) and an end time (T2, T4, T6, and T8) for each of the four time slots.

Figure 4A:
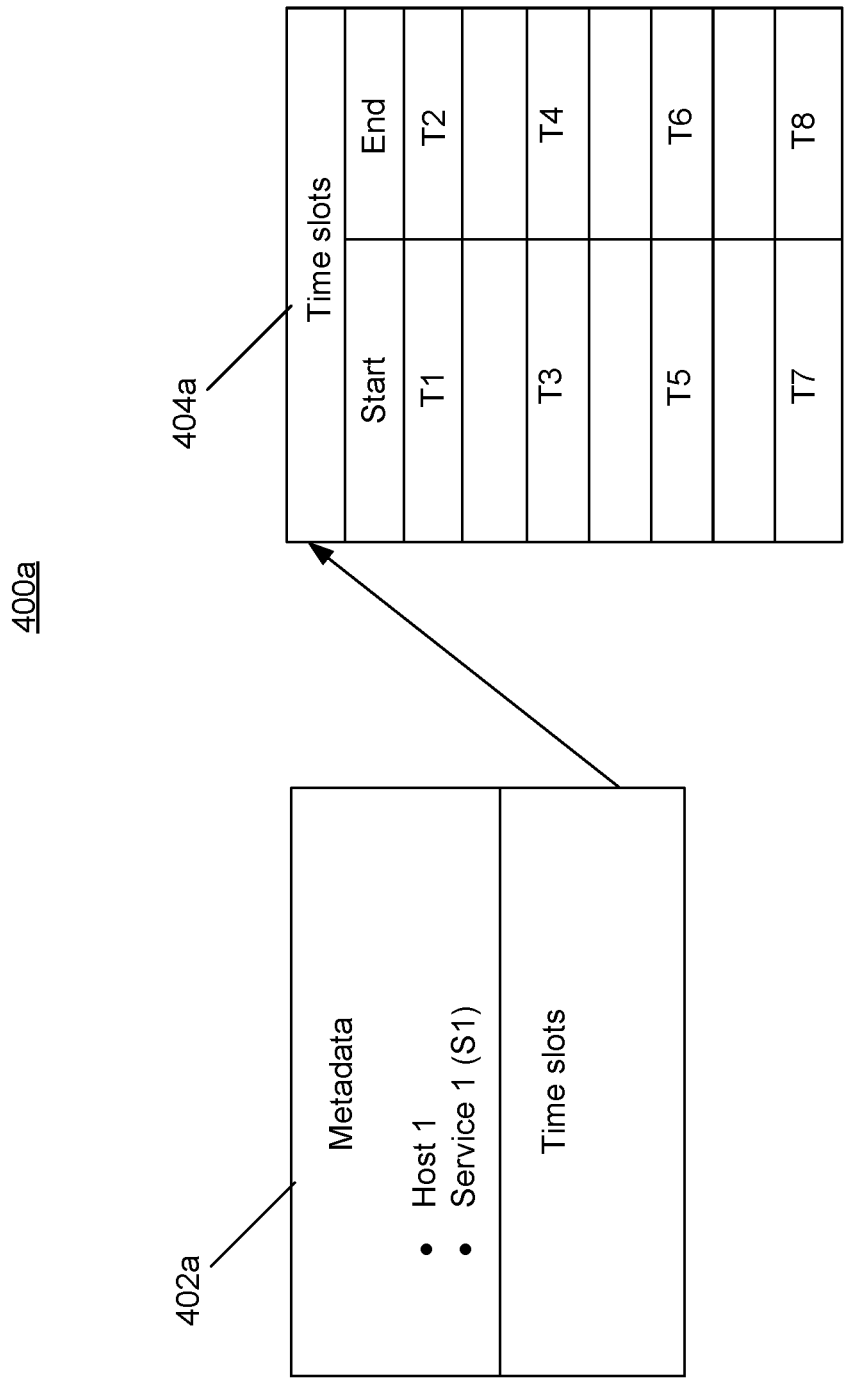
FIG. 4A is an example output of the analysis module for Host 1 of FIG. 1.

Referring to FIGS. 4A-4E, example outputs 400a-400e of the analysis module 120 are illustrated for five hosts. In FIG. 4A, the analysis module 120 generates annotated query output 400a for Host 1. The annotated query output 400a includes metadata 402a listing the host name, Host 1, the services supported, Service 1 (S1), and the time slots 404a with the lowest resource consumption based on the results of the query of the time series performance data module 132. In this example, the time slots 404a during which host 1 has the lowest resource consumption are T1-T2, T3-T4, T5-T6, and T7-T8, with the first time in the slot indicating the start time of the time slot and the second time in the slot indicating the end time of the time slot.

Figure 4B:
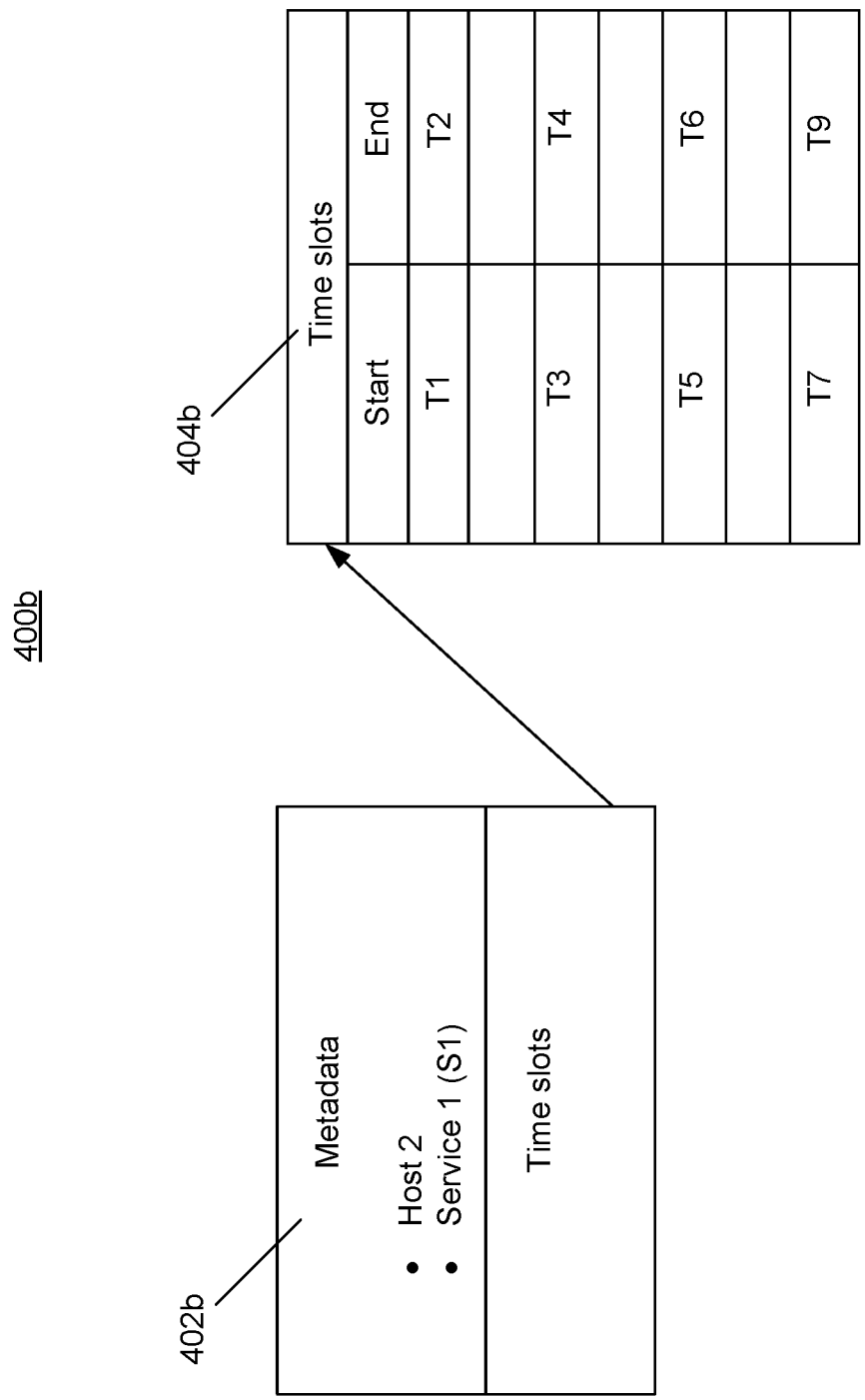
FIG. 4B is an example output of the analysis module for Host 2 of FIG. 1.

In FIG. 4B, the analysis module 120 generates annotated query output 400b for Host 2. The annotated query output 400b includes metadata 402b listing the host name, Host 2, the services supported, Service 1 (S1), and the time slots 404b with the lowest resource consumption based on the results of the query of the time series performance data module 132. In this example, the time slots 404b during which Host 2 has the lowest resource consumption are T1-T2, T3-T4, T5-T6, and T7-T9, with the first time in the slot indicating the start time of the time slot and the second time in the slot indicating the end time of the time slot.

Figure 4C:
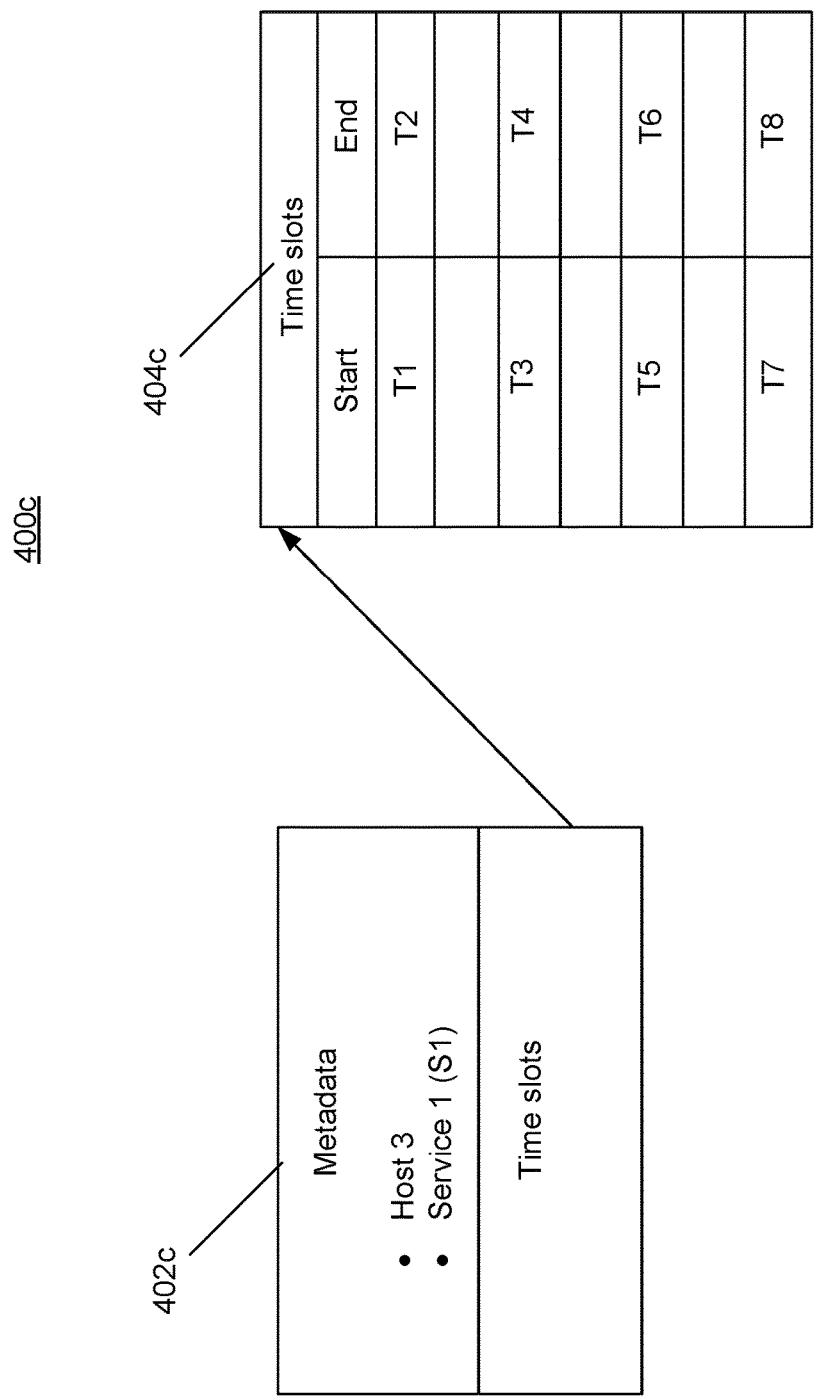
FIG. 4C is an example output of the analysis module for Host 3 of FIG. 1.

In FIG. 4C, the analysis module 120 generates annotated query output 400c for Host 3. The annotated query output 400c includes metadata 402c listing the host name, Host 3, the services supported, Service 1 (S1), and the time slots 404c with the lowest resource consumption based on the results of the query of the time series performance data module 132. In this example, the time slots 404c during which Host 3 has the lowest resource consumption are T1-T2, T3-T4, T5-T6, and T7-T8, with the first time in the slot indicating the start time of the time slot and the second time in the slot indicating the end time of the time slot.

In FIG. 4D, the analysis module 120 generates annotated query output 400d for Host 4. The annotated query output 400d includes metadata 402d listing the host name, Host 4, the services supported, Service 1 (S1), and the time slots 404d with the lowest resource consumption based on the results of the query of the time series performance data module 132. In this example, the time slots 404d during which Host 4 has the lowest resource consumption are T1-T2, T3-T4, T5-T6, and T7-T9, with the first time in the slot indicating the start time of the time slot and the second time in the slot indicating the end time of the time slot.

Figure 4E:
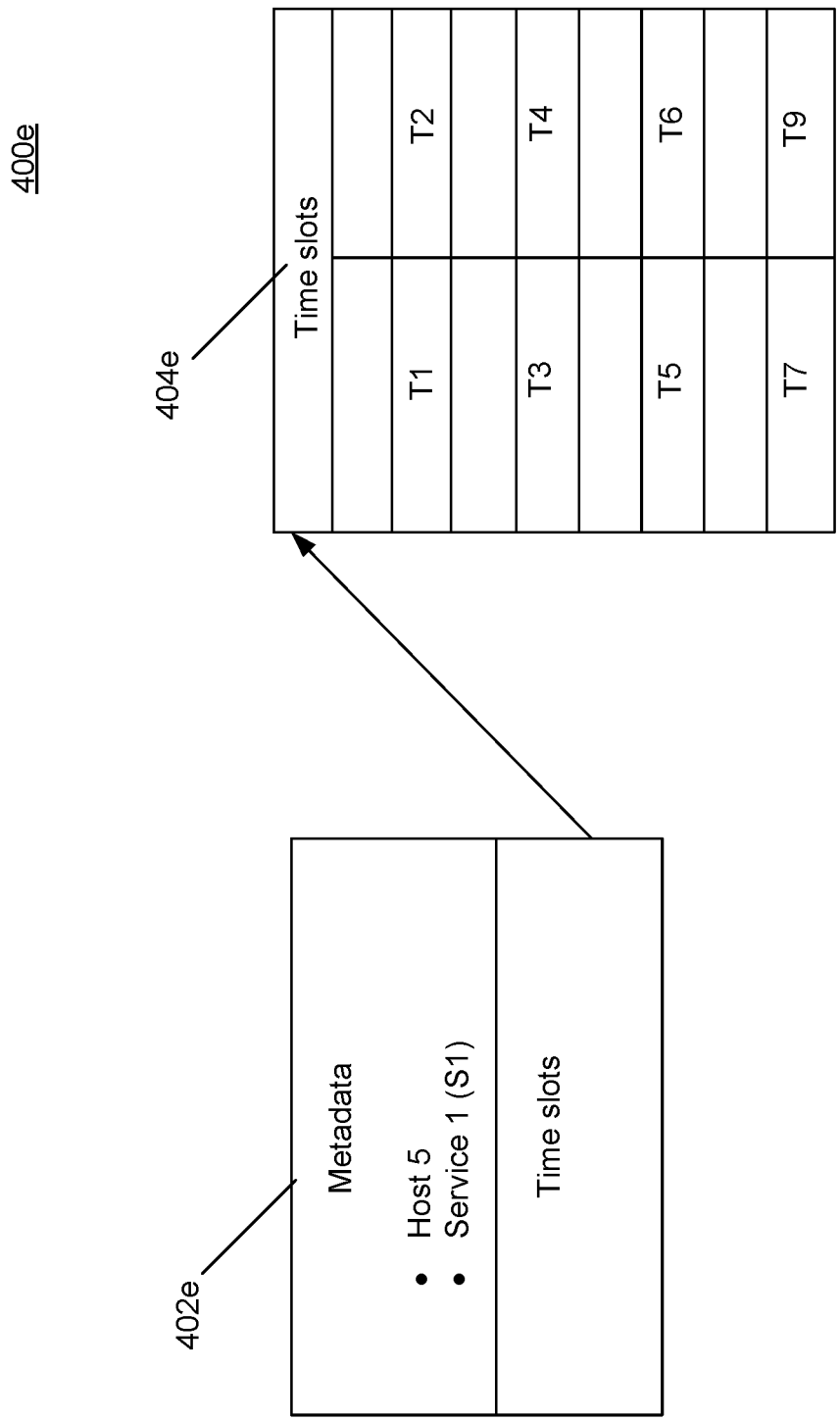
FIG. 4E is an example output of the analysis module for Host 5 of FIG. 1.

In FIG. 4E, the analysis module 120 generates annotated query output 400e for Host 5. The annotated query output 400e includes metadata 402e listing the host name, Host 5, the services supported, Service 1 (S1), and the time slots 404e with the lowest resource consumption based on the results of the query of the time series performance data module 132. In this example, the time slots 404e during which Host 5 has the lowest resource consumption are T1-T2, T3-T4, T5-T6, and T7-T9, with the first time in the slot indicating the start time of the time slot and the second time in the slot indicating the end time of the time slot.

Referring back to FIG. 1, once the analysis module 120 has generated the annotated query outputs for each host, the grouping module 122 creates groups of time slots using the service tags. That is, the grouping module 122 uses the service tags that were annotated for each host to group the time slots. In some implementations, the default services definition from a discovery process, such as a Configuration Management Database (CMDB) discovery process, is used if the components all belong to a single service, such as in the example of FIGS. 4A-4E. For example, with respect to the example of FIGS. 4A-4E, the grouping module 122 uses the service tags, such as 402a-402e, including the corresponding time slots 404a-404e, to create groups of time slots listing the hosts and the time slots for the service, Service 1 (S1).

It is common for a host or other components to support more than one service. In this situation when a host supports more than one service, the grouping module 122 generates a logical group of all the hosts from each of the services.

Figure 5:
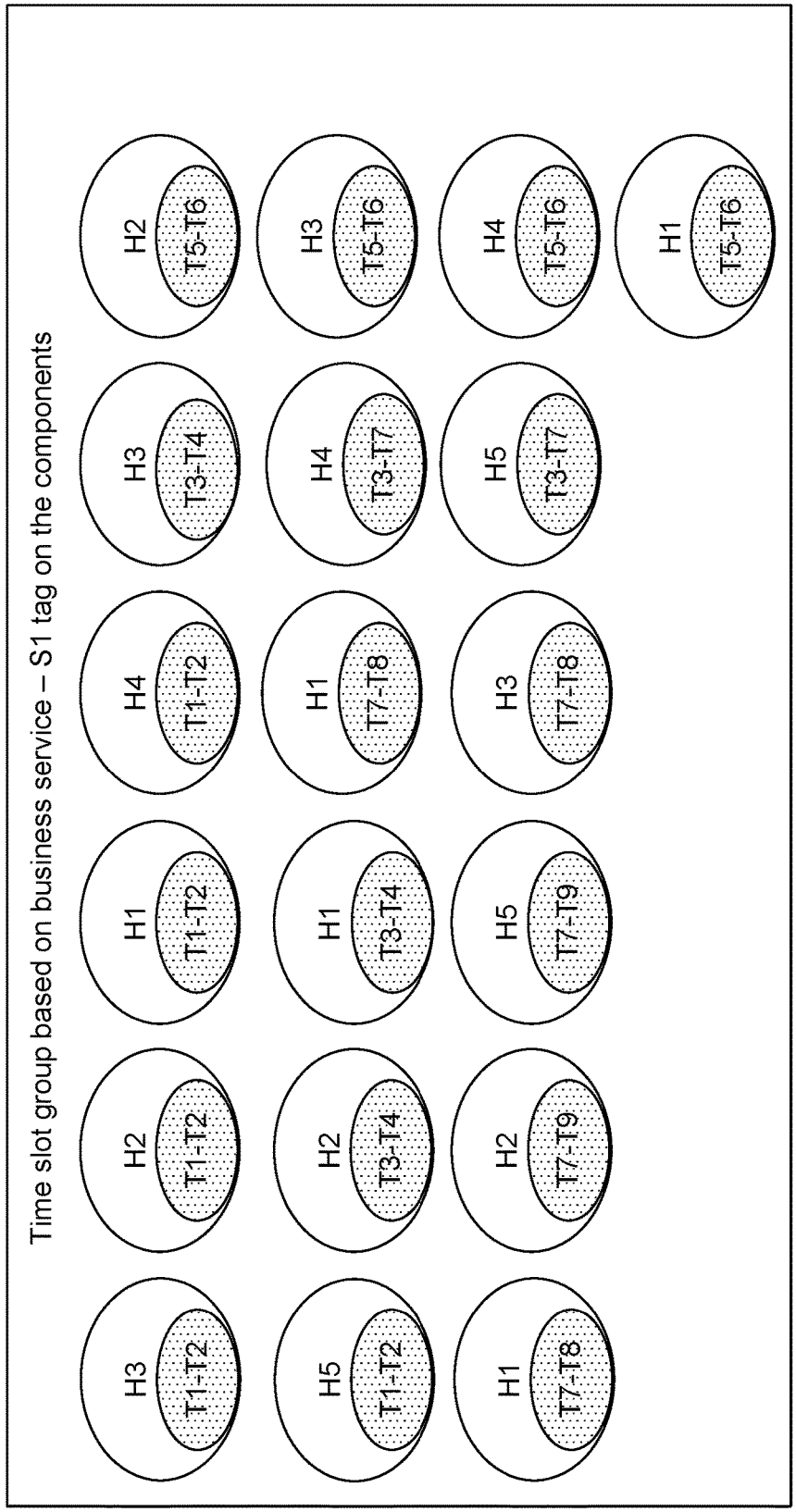
FIG. 5 is an example output of the grouping module of FIG. 1.

Referring to FIG. 5, an example output 500 from the grouping module 122 is illustrated. The output 500 is a grouping of the information from FIGS. 4A-4E into a single grouping since all of the hosts include the S1 tag and none of the hosts belong to multiple services. This is considered a service-aware grouping of the hosts because all of the hosts supporting a particular service are grouped together along with the time slots for those hosts with the lowest resource consumption.

More specifically, the output 500 includes the four time slots identified for Host 1, as illustrated in FIG. 4A. For Host 1 (H1), the four time slots of lowest resource consumption are T1-T2, T3-T4, T5-T6, and T7-T8. The output 500 includes the four time slots identified for Host 2 (H2), as illustrated in FIG. 4B. For Host 2, the four time slots of lowest resource consumption are T1-T2, T3-T4, T5-T6, and T7-T9. In a similar manner, the output 500 also includes the time slots for Host 3 (H3) and Host 4 (H4).

Referring back to FIG. 1, after the grouping module 122 creates the groups of time slots using the service tags, the cluster module 124 uses dynamic clustering to create clusters of hosts using the groups of time slots. Then, from the created clusters, the cluster module 124 generates at least one common change window by eliminating duplicate hosts from the clusters.

For example, the cluster module 124 applies a dynamic clustering method to the output 500 of FIG. 5. That is, based on the mined time slots of FIG. 5, dynamic clustering is applied on the time slots for the hosts. The cluster module 124 selects an initial host and creates initial clusters of time slots for the initial host. The cluster module 124 then adds other hosts to the initial clusters of time slots using a distance measurement means. For example, the cluster module 124 adds other hosts to the initial clusters of time slots when a Euclidean distance between time slots for the other hosts and the initial clusters of time slots are within a threshold distance. The following is the Euclidean distance formula to measure the distance between time slots. $\sqrt{(Txi-Tyi)^2+(Txj-Tyj)^2}$ between the time slots=<x where (for example, x=2).

Figure 6:
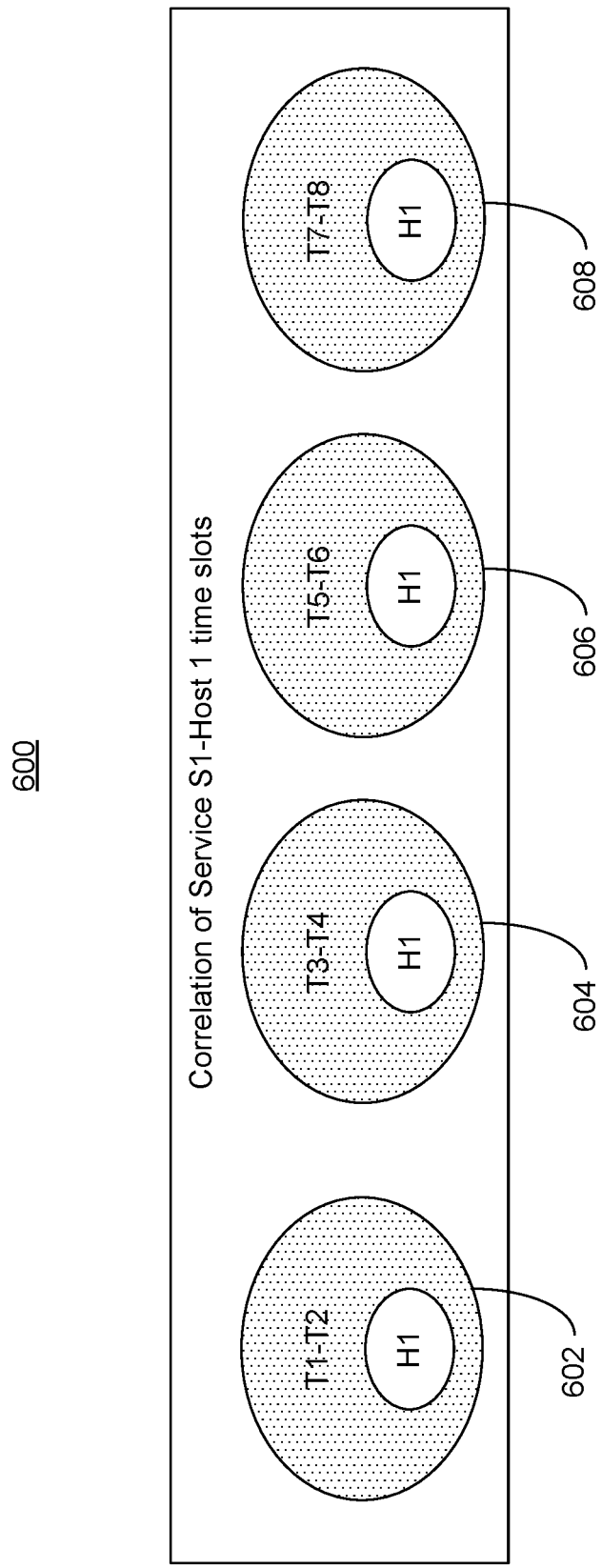
FIG. 6 is an example of clustering process for an initial cluster performed by the cluster module of FIG. 1.

Referring to FIG. 6, the cluster module 124 selected H1 as the initial host to start creating an initial set of time slot clusters 600. In FIG. 6, the set of time slot clusters 600 includes four (4) time slots for the services that the host belongs to. For example, the set of time slot clusters 600 includes a first cluster 602 for time slot T1-T2, a second cluster 604 for time slot T3-T4, a third cluster 606 for time slot T5-T6, and a fourth cluster 608 for time slot T7-T8. Thus, the cluster module 124 creates time slot centric groupings as shown in FIG. 6.

Figure 7:
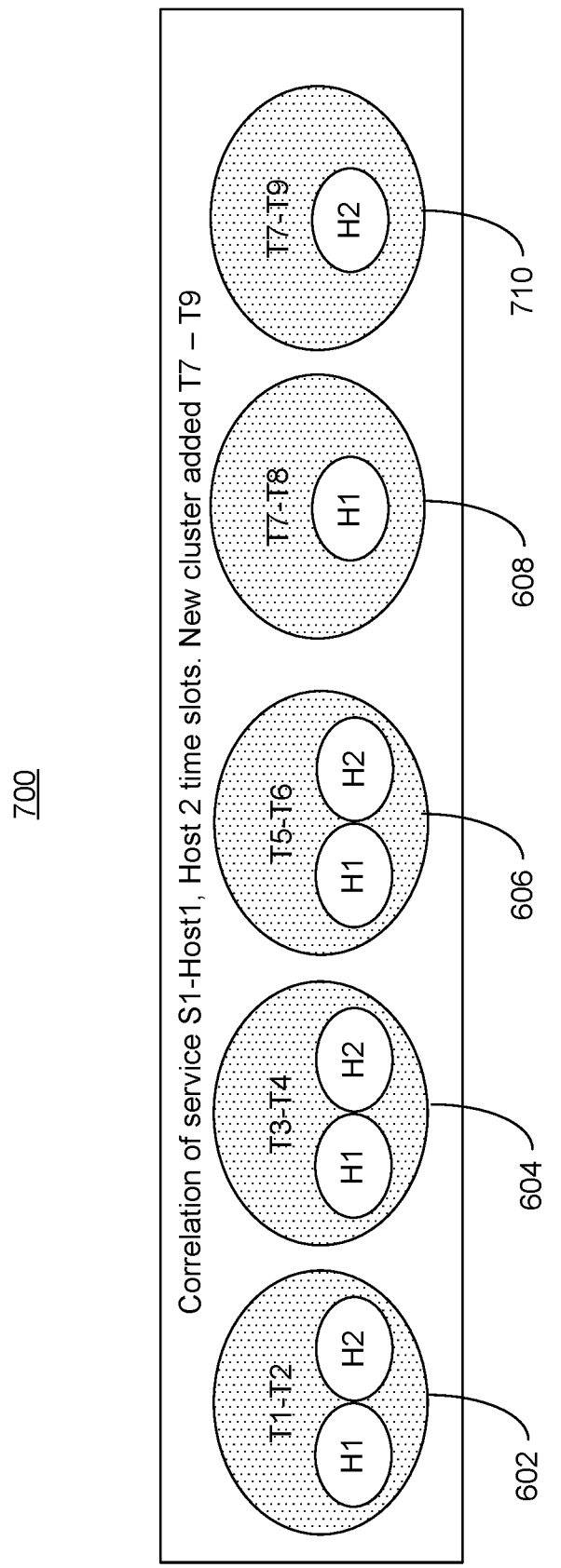
FIG. 7 is an example of clustering process for a follow-on cluster performed by the cluster module of FIG. 1.

Referring to FIG. 7, the cluster module 124 then adds other hosts, such as host H2, to the initial set of clusters 600 to create a follow on set of clusters 700. Because H2 includes times slots T1-T2, T3-T4, and T5-T6, H2 is added to those clusters created for H1, including the first cluster 602, the second cluster 604, and the third cluster 606. In addition, the cluster module 124 creates a new cluster 710 for H2 for the time slot T7-T9 because H1 does not have that time slot as a low resource consumption time. Thus, the fifth cluster 710 is for the time slot T7-T9 into which H2 is placed.

Figure 8:
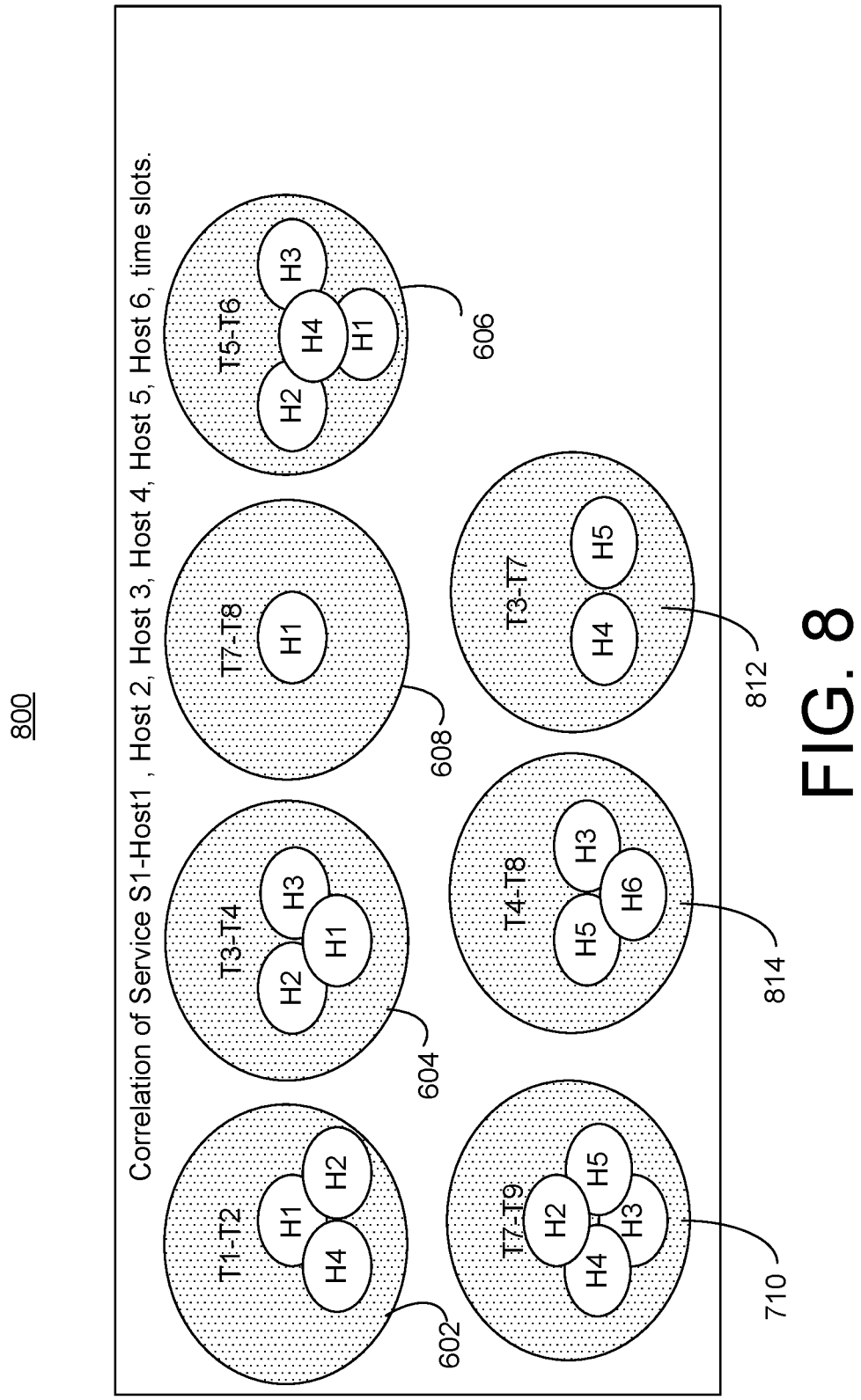
FIG. 8 is an example of clustering process for a final cluster performed by the cluster module of FIG. 1.

Referring to FIG. 8, the cluster module 124 continues to add other hosts to the follow on set of clusters 700 using the Euclidean distance to determine when the time slots for one host should be grouped with the time slots of another host. In FIG. 8, a final set of clusters 800 is illustrated showing seven clusters of time slots and the hosts within each of the time slot clusters. In this manner, a sixth cluster 812 for the time slot T3-T7 is added and a seventh cluster 814 for the time slot T4-T8. The final set of clusters includes: the first cluster 602, which includes hosts H1, H2, and H4; the second cluster 604, which includes hosts H1, H2, and H3; the third cluster 606, which includes hosts H1, H2, H3, and H4; the fourth cluster 608, which includes host H1; the fifth cluster 710, which includes hosts H2, H3, H4, and H5; the sixth cluster 812, which includes hosts H4 and H5; and the seventh cluster 814, which includes hosts H3, H5, and H6.

The cluster module 124 is configured to take the set of final clusters 800 and to eliminate duplicate hosts from the clusters (602, 604, 606, 608, 710, 812, and 814) using the weight of the cluster to determine which clusters to eliminate. That is, as seen in FIG. 8, several hosts are members of multiple clusters. The cluster module 124 uses the weight of the cluster to eliminate duplicates.

In some implementations, the cluster module 124 calculates the weight of the cluster where the cluster weight equals the count of hosts in the cluster. Using the cluster weights, each host that appears in more than one cluster is removed from the cluster which has the lowest weight. This process is iteratively performed, recalculating cluster weights before each round, until no more hosts can be eliminated and a common change window is identified.

In some implementations, the cluster module 124 uses a weight that is assigned to each host based on the criticality of the host within the service and the weight of the cluster is the sum of the weight of all hosts within the cluster. The cluster module 124 removes a host from the lowest weight of the cluster if the hosts belong to the cluster. This is iteratively performed until no more hosts can be eliminated and a common change window is identified.

Figure 9:
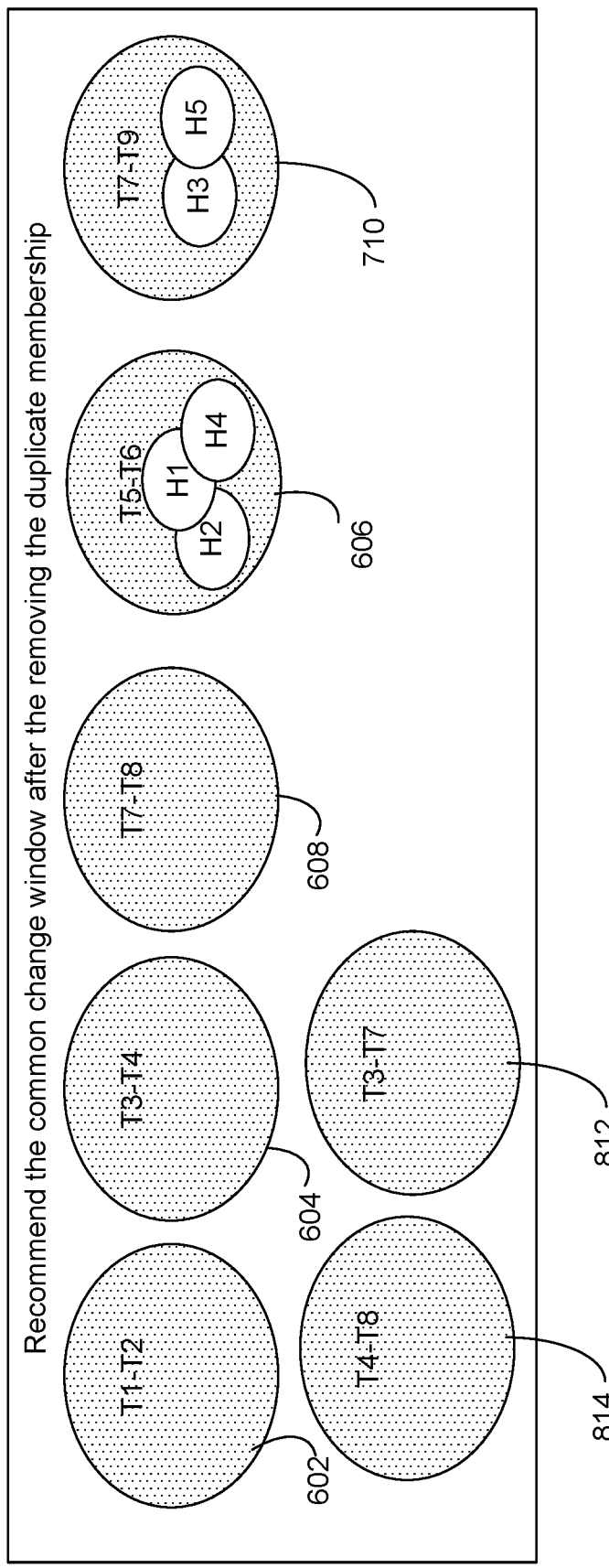
FIG. 9 is an example of the recommend change window output.

Referring to FIG. 9, a common change window is identified based on the time slot clusters which have one or more than one host membership. For instance, the third cluster 606 is identified as a change window where hosts H1, H2, and H4 are recommended to be taken down during the T5-T6 time slot. Also, the fifth cluster 710 is identified as a change window where hosts H3 and H5 are recommended to be taken down during the time slot T7-T9. These two identified change windows (606 and 710) are the optimum times to take down these hosts with the least amount of impact to the service S1.

Figure 2:
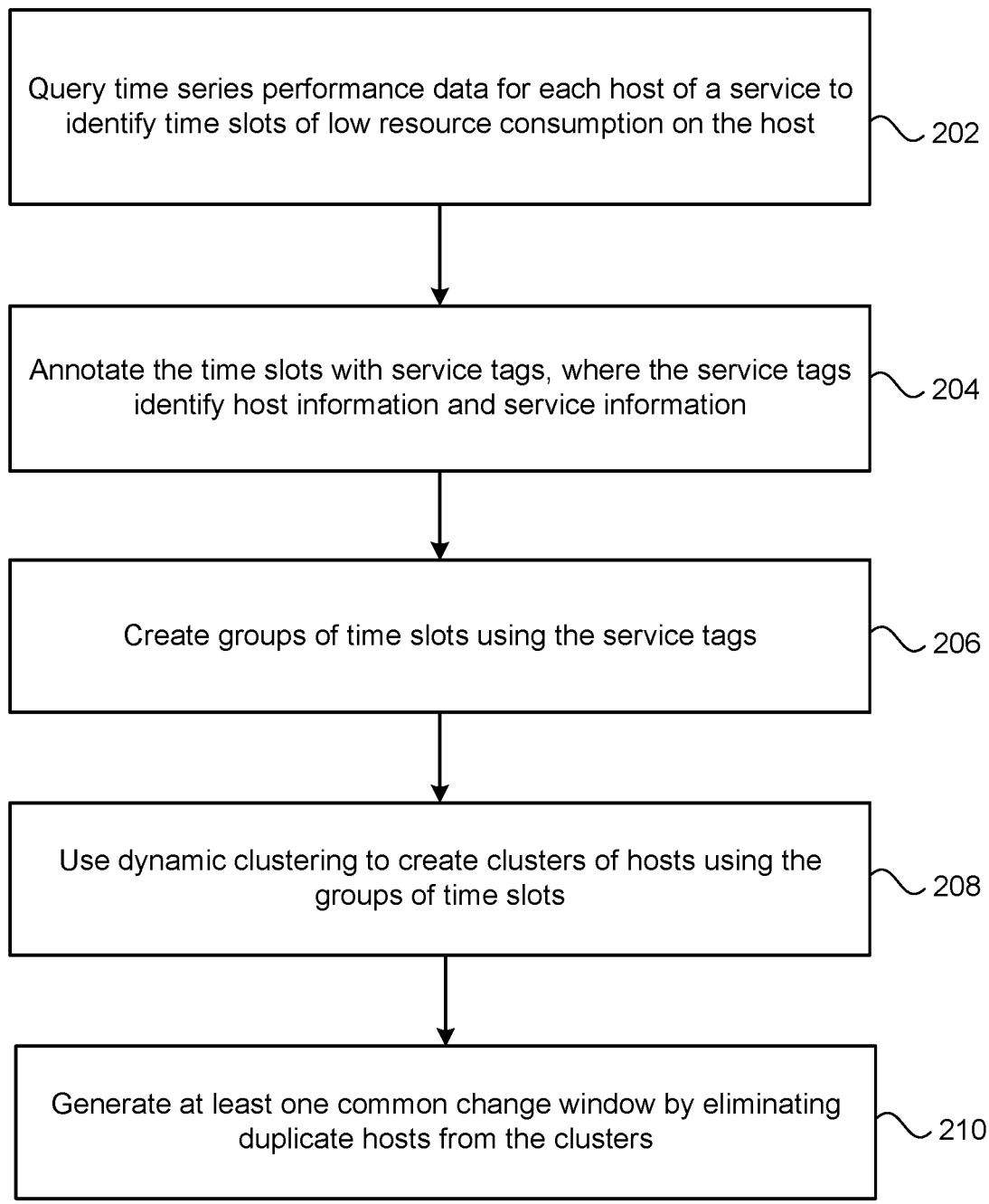
FIG. 2 is a flowchart illustrating example operations of the system of FIG. 1.

Referring to FIG. 2, an example process 200 illustrates example operations of the system 100 of FIG. 1. More specifically, process 200 illustrates an example of a computer-implemented method to identify a common change window for one or more services implemented on one or more hosts. Instructions for the performance of process 200 may be stored in the at least one memory 104 and executed by the at least one processor 106 on the computing device 102. The instructions for the performance of process 200 may cause the at least one processor 106 to implement the application 108 and its components.

Process 200 includes querying time series performance data for each host of a service to identify time slots of low resource consumption on the host (202). For example, with respect to FIG. 1 and the application 108, an analysis module 120 is configured to query time series performance data for each host of a service to identify time slots of low resource consumption on the host.

Process 200 includes annotating the time slots with service tags, where the service tags identify host information and service information (204). For example, with respect to FIG. 1 and the application 108, the analysis module 120 is configured to annotate the time slots with service tags, where the service tags identify host information and service information.

Process 200 includes creating groups of time slots using the service tags (206). For example, with respect to FIG. 1 and the application 108, the grouping module is configured to create groups of time slots using the service tags. Creating the groups of time slots (206) may include creating the groups of time slots for each service utilizing at least one of the hosts.

Process 200 includes using dynamic clustering to create clusters of hosts using the groups of time slots (208). For example, with respect to FIG. 1 and the application 108, the cluster module 124 is configured to use dynamic clustering to create clusters of hosts using the groups of time slots.

Using dynamic clustering (208) may include selecting an initial host and creating initial clusters of time slots for the initial host, adding other hosts to the initial clusters of time slots when a distance (e.g., a Euclidean distance) between time slots for the other hosts and the initial clusters of time slots are within a threshold distance, and creating and adding new time slots to the initial clusters of time slots when the distance between the time slots for the other hosts and the initial clusters of time slots exceed the threshold distance.

Process 200 includes generating at least one common change window by eliminating duplicate hosts from the clusters (210). For example, with respect to FIG. 1 and the application 108, the cluster module 124 is configured to generate at least one common change window by eliminating duplicate hosts from the clusters. In some implementations, generating the at least one common change window (210) includes calculating a weight of each cluster using a count of hosts in each cluster and, for the duplicate hosts in multiple clusters, removing the duplicate hosts from the clusters having the lowest weight. In some implementations, generating the at least one common change window (210) includes assigning a host weight to each host based on a criticality of the host within the service, calculating a weight for each cluster using a sum of the host weights, and for the duplicate hosts in multiple clusters, removing the duplicate hosts from the clusters having the lowest weight.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for identifying a common change window for one or more services implemented on one or more hosts, the computer-implemented method comprising:
    querying time series performance data for each host of a service to identify time slots of low resource consumption on the host;
    annotating the time slots with service tags, wherein the service tags identify host information and service information;
    creating groups of time slots using the service tags;
    using dynamic clustering to create clusters of hosts using the groups of time slots; and
    generating at least one common change window by eliminating duplicate hosts from the clusters of the hosts.

2. The computer-implemented method as in claim 1, further comprising enabling selection of the at least one common change window via a graphical user interface on a display.

3. The computer-implemented method as in claim 1, further comprising monitoring each of the hosts and collecting the time series performance data from each of the hosts over a network, wherein the time series performance data includes the resource consumption on the host.

4. The computer-implemented method as in claim 1, wherein creating the groups of time slots comprises creating the groups of time slots for each service utilizing at least one of the hosts.

5. The computer-implemented method as in claim 1, wherein using dynamic clustering to create the clusters of hosts comprises:
  selecting an initial host and creating initial clusters of time slots for the initial host;
  adding other hosts to the initial clusters of time slots when a distance between time slots for the other hosts and the initial clusters of time slots are within a threshold distance; and
  creating and adding new time slots to the initial clusters of time slots when the distance between the time slots for the other hosts and the initial clusters of time slots exceed the threshold distance.

6. The computer-implemented method as in claim 1, wherein generating the at least one common change window comprises:
  calculating a weight of each cluster using a count of hosts in each cluster; and
  for the duplicate hosts in multiple clusters, removing the duplicate hosts from the clusters of the hosts having a lowest weight.

7. The computer-implemented method as in claim 1, wherein generating the at least one common change window comprises:
  assigning a host weight to each host based on a criticality of the host within the service;
  calculating a weight for each cluster using a sum of the host weights; and
  for the duplicate hosts in multiple clusters, removing the duplicate hosts from the clusters of the hosts having a lowest weight.

8. A computer program product for identifying a common change window for one or more services implemented on one or more hosts, the computer program product being tangibly embodied on a non-transitory computer-readable medium and including executable code that, when executed by at least one computing device, is configured to cause the at least one computing device to:
  query time series performance data for each host of a service to identify time slots of low resource consumption on the host;
  annotate the time slots with service tags, wherein the service tags identify host information and service information;
  create groups of time slots using the service tags;
  use dynamic clustering to create clusters of hosts using the groups of time slots; and
  generate at least one common change window by eliminating duplicate hosts from the clusters of the hosts.

9. The computer program product of claim 8, further comprising executable code that, when executed by the at least one computing device, is configured to cause the at least one computing device to enable selection of the at least one common change window via a graphical user interface on a display.

10. The computer program product of claim 8, further comprising executable code that, when executed by the at least one computing device, is configured to cause the at least one computing device to monitor each of the hosts and collect the time series performance data from each of the hosts over a network, wherein the time series performance data includes the resource consumption on the host.

11. The computer program product of claim 8, wherein the executable code that, when executed by the at least one computing device, is configured to cause the at least one computing device to create the groups of time slots comprises executable code that, when executed by the at least one computing device, is configured to cause the at least one computing device to create the groups of time slots for each service utilizing at least one of the hosts.

12. The computer program product of claim 8, wherein the executable code that, when executed by the at least one computing device, is configured to cause the at least one computing device to use dynamic clustering to create the clusters of hosts comprises executable code that, when executed by the at least one computing device, is configured to cause the at least one computing device to:
  select an initial host and creating initial clusters of time slots for the initial host;
  add other hosts to the initial clusters of time slots when a distance between time slots for the other hosts and the initial clusters of time slots are within a threshold distance; and
  create and add new time slots to the initial clusters of time slots when the distance between the time slots for the other hosts and the initial clusters of time slots exceed the threshold distance.

13. The computer program product of claim 8, wherein the executable code that, when executed by the at least one computing device, is configured to cause the at least one computing device to generate the at least one common change window comprises executable code that, when executed by the at least one computing device, is configured to cause the at least one computing device to:
  calculate a weight of each cluster using a count of hosts in each cluster; and
  for the duplicate hosts in multiple clusters, remove the duplicate hosts from the clusters of the hosts having a lowest weight.

14. The computer program product of claim 8, wherein the executable code that, when executed by the at least one computing device, is configured to cause the at least one computing device to generate the at least one common change window comprises executable code that, when executed by the at least one computing device, is configured to cause the at least one computing device to:
  assign a host weight to each host based on a criticality of the host within the service;
  calculate a weight for each cluster using a sum of the host weights; and
  for the duplicate hosts in multiple clusters, remove the duplicate hosts from the clusters of the hosts having a lowest weight.

15. A system for identifying a common change window for one or more services implemented on one or more hosts, the system comprising:
  at least one memory including instructions; and
  at least one processor that is operably coupled to the at least one memory and that is arranged and configured to execute instructions that, when executed, cause the at least one processor to implement an application, the application comprising:
    an analysis module that is configured to
      query time series performance data for each host of a service to identify time slots of low resource consumption on the host, and
      annotate the time slots with service tags, wherein the service tags identify host information and service information;
    a grouping module that is configured to create groups of time slots using the service tags; and
    a cluster module that is configured to
      use dynamic clustering to create clusters of hosts using the groups of time slots, and generate at least one common change window by eliminating duplicate hosts from the clusters of the hosts.

16. The system of claim 15, further comprising a graphical user interface on a display that is configured to enable selection of the at least one common change window.

17. The system of claim 15, further comprising a monitoring module that is configured to monitor each of the hosts and collect the time series performance data from each of the hosts over a network, wherein the time series performance data includes the resource consumption on the host.

18. The system of claim 15, wherein the grouping module is configured to create the groups of time slots for each service utilizing at least one of the hosts.

19. The system of claim 15, wherein the cluster module is configured to:
    select an initial host and creating initial clusters of time slots for the initial host;
    add other hosts to the initial clusters of time slots when a distance between time slots for the other hosts and the initial clusters of time slots are within a threshold distance; and
    create and add new time slots to the initial clusters of time slots when the distance between the time slots for the other hosts and the initial clusters of time slots exceed the threshold distance.

20. The system of claim 15, wherein the cluster module is configured to:
    calculate a weight of each cluster using a count of hosts in each cluster; and
    for the duplicate hosts in multiple clusters, remove the duplicate hosts from the clusters having a lowest weight.

21. The system of claim 15, wherein the cluster module is configured to:
    assign a host weight to each host based on a criticality of the host within the service;
    calculate a weight for each cluster using a sum of the host weights; and
    for the duplicate hosts in multiple clusters, remove the duplicate hosts from the clusters having a lowest weight.

* * * * *